Oct. 4, 1960     G. R. KLEMME     2,954,682
AUTOMOBILE ICE BOX
Filed Feb. 25, 1957     2 Sheets-Sheet 1
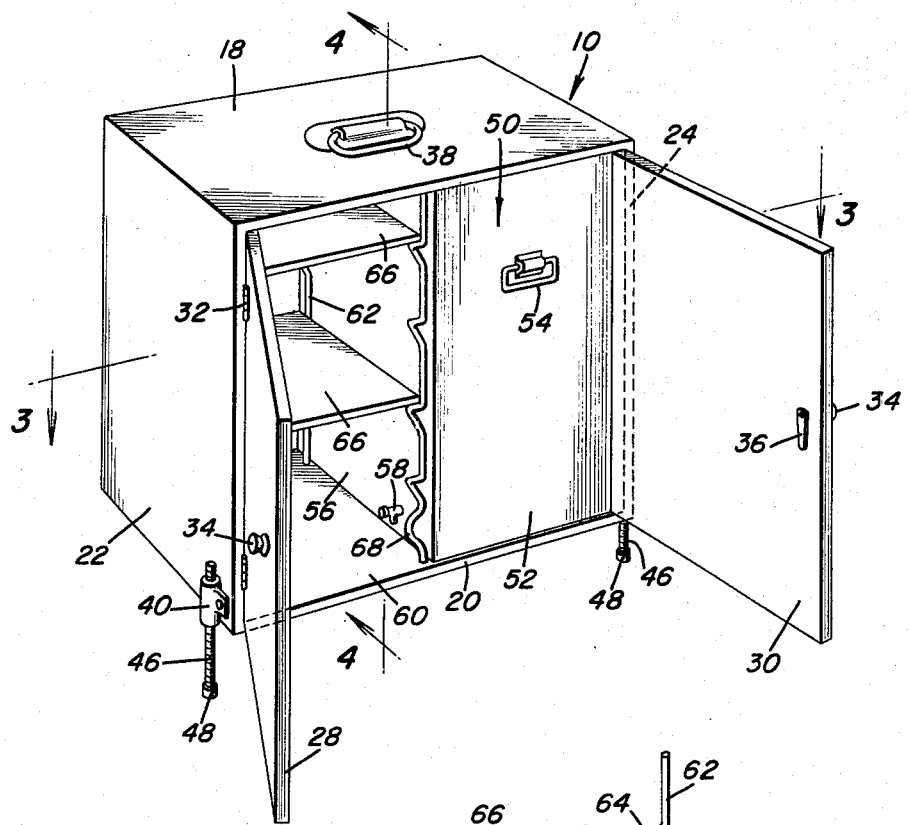
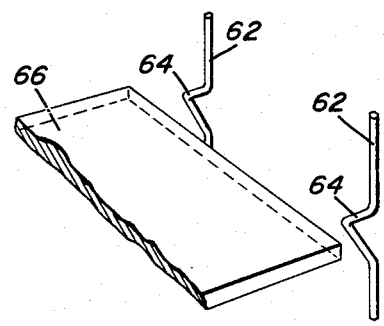
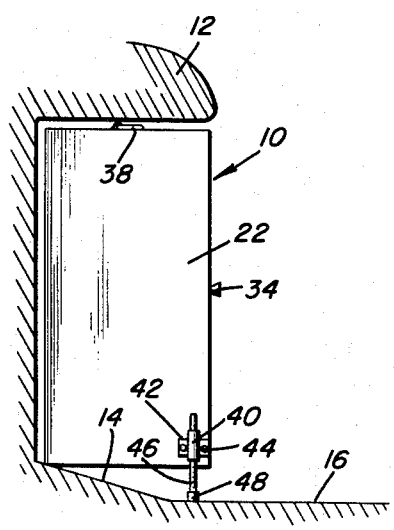
Gilbert R. Klemme
INVENTOR.

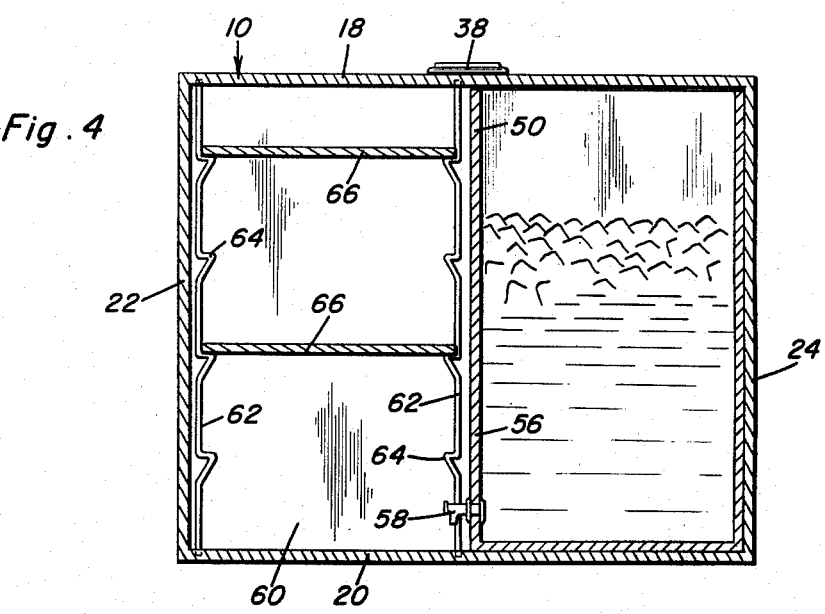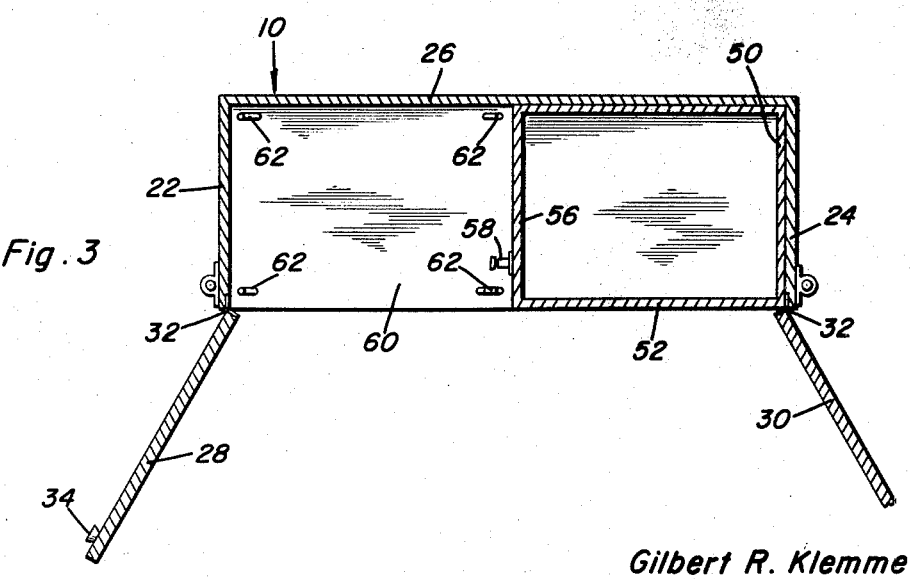

United States Patent Office 2,954,682
Patented Oct. 4, 1960

2,954,682

AUTOMOBILE ICE BOX

Gilbert R. Klemme, 1222 NW. 2nd,
Oklahoma City 4, Okla.

Filed Feb. 25, 1957, Ser. No. 642,059

4 Claims. (Cl. 62—259)

This invention comprises a novel and useful automobile ice box and more particularly relates to an ice box cabinet specifically constructed to compactly fit into an automobile in the space below the dash and above the upwardly inclined floor portion of the automobile.

The primary purpose of this invention is to provide an ice box which shall be capable of being compactly installed in an automobile in such a manner as to be readily available for use with a minimum of difficulty while in the automobile, and which will offer as little interference as possible with the feet or persons of the occupants of the vehicle.

A further important object of the invention is to provide an ice box in accordance with the preceding object which shall be of a portable nature, whereby the same may be readily compactly positioned in the automobile, for transportation of the ice box and for rendering its services available during travel of the automobile; and which shall be readily moved from the automobile to camp sites, picnic locations and the like in order to avail of its services outside of the automobile.

Yet another object of the invention is to provide an ice box as set forth in the preceding objects which shall be so constructed that when positioned below the dash of an automobile, no portion of the device shall project rearwardly of the dash; and yet wherein ready access may be had to the interior of the ice box when so positioned.

A still further object of the invention is to provide an ice box which shall be especially adapted, as set forth in the preceding objects, to fit within the space between the dash and floorboard of an automotive vehicle, to make maximum use of this space available, and wherein means are provided for supporting the device upon a relatively inclined portion of the floorboard of the vehicle in a level position thereon.

A still further object of the invention is to provide an ice box in compliance with the above mentioned objects which shall compactively house both an ice and water container element, capable of removal through the open, door controlled front of the cabinet of the device, together with a chilled compartment adjacent the ice or water container and which will admit of the vertical adjustment of supporting shelves therein for food, beverages or other objects.

An additional important purpose of the invention is to provide an ice box in accordance with the above set forth objects wherein the ice or water container shall be provided with a discharge spout housed entirely within the cabinet of the device and accessible through the front doors of the cabinet.

And a final important purpose of the invention is to provide an improved ice box especially adapted for automotive use in compliance with the hereinbefore set forth objects and in which the utility of the ice box shall be enhanced by the provision of a carrying handle upon the exterior top surface of the cabinet of the device, and a handle upon the front surface of the ice and water container and which is accessible through horizontally swinging door closures of the cabinet.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1 is a perspective view of a suitable construction of ice box incorporating therein the principles of this invention, the horizontally swinging front door closure of the device being shown in open position for viewing the interior of the device;

Figure 2 is a detail view in vertical section showing the manner in which the ice box in accordance with this invention is compactly and conveniently disposed beneath the dash of an automotive vehicle;

Figure 3 is a horizontal longitudinal sectional view taken substantially upon the plane indicated by the section line 3—3 of Figure 1 and showing in plan the relative positions of the ice and water container, the supports for the trays or shelves and the chilled compartment of the cabinet;

Figure 4 is a vertical transverse sectional view taken substantially upon the planes indicated by the section line 4—4 of Figure 1 and showing in vertical view the relative positions of the chilled compartment, the ice and water container and the adjustable shelves of the ice box; and Figure 5 is a fragmentary perspective detail view showing the manner in which a shelf or tray may be removably carried by support elements of the support means in the chilled compartment of the cabinet.

There is at present a great need for a portable type of ice box or refrigerator adapted for the use of groups as well as individuals and which may be employed for picnics, or the like, and which must be transported in automobiles. Heretofore, the transport of an ice box of this character in automobiles has been unsatisfactory because of the difficulty in packing it along with the relatively large amount of other objects which must be carried in the vehicle so that the ice box is not readily available for use of the occupants of the vehicle during travel of the same. Further, such ice boxes, if mounted so as to be available to the access of the occupants of the vehicle during travel of the latter, usually greatly interfere with the freedom of movement of the persons in the vehicle, and if mounted in the front of the vehicle frequently cramp the leg room of the occupants.

It is therefore the primary intent of this invention to provide an ice box construction which shall meet all of the desirable uses and advantages above set forth, and yet which may be so positioned in an automotive vehicle that it will be instantly available for access by the occupants; yet will in no way interfere with the freedom of movement and convenience of the occupants and in particular will provide sufficient clearance beneath the same for the foot space use of the occupants.

Referring now more specifically to the accompanying drawings, it will be seen that the improved ice box, indicated generally by the numeral 10 and shown in its entirety in Figure 1 is of such a size, construction and shape that the same is adapted to be conveniently mounted in the space between the undersurface of the vehicle dash 12 and the forward upwardly inclined floor portion 14 below the dash, and forming a part of the floorboard portion 16 of the vehicle.

Referring now especially to Figures 1, 4 and 3, it will be seen that the ice box 10 includes a cabinet of any suitable construction and material, and which comprises preferably solid top and bottom walls 18 and 20 together with solid end walls 22 and 24 together with a solid back wall 26. The cabinet is further provided with an open front together with a pair of horizontally swinging doors 28 and 30, provided with hinges 32 by which they are mounted upon the end walls 22 and 24, and which constitute closures for the interior of the cabinet.

The doors are provided with handles or knobs 34, at least one of which may be provided with a latch member 36 whereby the doors may be swung open or closed and may be latched in their closed position as desired. It will also be observed that the doors in their closed position lie within the edges of the top, bottom and end walls of the open front end of the cabinet to thus provide a compact structure, when closed, with a minimum of outwardly projecting parts beyond the flat surfaces of the same.

In order to provide portability for the device the top wall 18 is provided with a carrying handle 38 of any suitable construction, adapted to lie flat upon the top wall of the same to permit the cabinet to be compactly mounted in the space below the dash 12 of the vehicle in a manner shown in Figure 2.

The cabinet at its forward portion is provided with a pair of adjustable supporting legs in order that the cabinet may be mounted in a level position in the space below the dash and supported by the legs and by the inclined portion 14 of the bottom wall of the automobile, as shown in Figure 2.

For this purpose the two end walls 22 and 24 of the cabinet, upon their exterior surfaces and at their lower and forward portions of the same are provided with internally threaded members in the form of collars or sleeves 40, having suitable flanges 42 together with fasteners 44 by means of which they may be secured to the exterior surfaces at the lower front portions of the end walls as shown clearly in Figures 1 and 2. Extending through these internally threaded sleeves 40 are externally threaded members 46 constituting legs and having foot members 48 thereon of any desired construction. It will be obvious that when the cabinet is positioned in the space below the dash, the rearward end of the bottom wall 20 will rest upon the upwardly inclined portion 14 and the adjustable legs will be threadedly adjusted in their support sleeves 40 to engage the bottom wall 14 or 16 of the vehicle and thus position the cabinet in a let up position, with its upper surface closely adjacent the underlying surface of the dash, with its back wall closely adjacent the back of the recess under the dash, and with its bottom wall raised from the bottom wall 16 of the automotive vehicle in order to provide clearance for the feet of the passengers therebeneath.

In this position, it is obvious that since no part of the cabinet will project into the interior of the automobile beyond the inward rim of the dash 12 and since the cabinet is so mounted as to provide clearance for the feet of the occupants beneath the same, that the contents of the cabinet will be readily accessible at all times while the article will provide a minimum obstruction or inconvenience to the position and movements of the occupants in the vehicle.

Referring now to Figures 1, 3 and 4, it will be observed that the interior of the cabinet is provided with a container or receptacle indicated generally by the numeral 50, and which is open at its top, and is provided with a front wall 52. Upon the side wall there is provided a handle 54 by means of which the container, adapted to receive ice, water or the like therein, may be readily introduced into or removed from the interior of the cabinet through the open doors of the same. The arrangement is such that when the container is within the cabinet, the top of the container will be closed by the top wall 18 of the cabinet while the door 30 will completely cover the front wall and handle 54 of the container in the closed position of the door.

Upon the lower forward portion of that side wall 56 of the container which is remote from the adjacent end wall 24 there is provided a conventional form of a discharge spout 58. This spout is thus entirely housed within the interior of the cabinet and access to the same may be had through the open door 28 of the housing. Thus the spout is protected against contact with dirt or the like, and liquid may be drawn from the container by placing a cup within the cabinet below the spout and by filling the cup through the open door of the cabinet. The most effective sanitation and hygienic conditions are thus provided for discharging the contents of the container and for protecting such contents against contamination.

Adjacent the end wall 22 the interior of the cabinet is provided with a chilled compartment designated generally by the numeral 60. This compartment is provided with sets of vertical supports each designated by the numeral 62. These supports may conveniently comprise rod like members, having their upper and lower ends secured in any convenient manner to the top and bottom walls 18 and 20 of the cabinet as suggested in Figure 4. One set of these supports is disposed closely adjacent to the container 52 and thus separates the latter from the chilled compartment 60.

The supports 62 are provided with any suitable number of vertically spaced support elements 64 thereon. Conveniently such elements may comprise laterally offset portions of the rods which are directed into the chilled compartment 60 and which are adapted to support thereon shelves or trays 66. It will thus be apparent that the shelves may be placed in various vertical adjusted positions in accordance with the size and shapes of the articles to be stored or placed thereon. Further, the shelves may be readily removed from the front of the cabinet for various purposes as desired.

Conveniently, one of the supports 62 may be provided at its lower end with an offset portion 68 adapted to provide a clearance through which the spout 58 may pass when the container 50 is removed from the cabinet.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an automobile having a dash overhanging a portion of the floor and wherein the forward portion of said floor beneath said dash is upwardly inclined, an ice box comprising a refrigerating cabinet of a height and width to fit snugly and entirely within the space lying between the underside of the dash and said floor, said cabinet including adjustable legs whereby to support the cabinet in level position upon said upwardly inclined portion of said floor, said cabinet having flat top and bottom walls and a back wall disposed in said base and at the back thereof, said back wall having a portion thereof resting directly upon said upwardly inclined portion of said floor, said cabinet having an open front with a pair of horizontally swinging door closures for said open front, said doors in their closed position lying beneath said dash, and a water container in said cabinet having a discharge spout disposed entirely in said cabinet and accessible through said doors.

2. The combination of claim 1 wherein said legs are mounted upon the exterior of the side walls of said cabinet and are rearwardly spaced from the front thereof.

3. The combination of claim 1 wherein said top wall closely underlies said dash.

4. The combination of claim 1 wherein said top wall closely underlies said dash, and a handle secured to said top wall.

(References on following page)

References Cited in the file of this patent

UNITED STATES PATENTS

| | | |
|---|---|---|
| 998,434 | Webb | July 18, 1911 |
| 1,732,359 | Gilmore | Oct. 22, 1929 |
| 1,967,431 | Replogle | July 24, 1934 |
| 2,272,848 | Miller | Feb. 10, 1942 |
| 2,287,404 | Zerk | June 23, 1942 |
| 2,479,170 | Kuempel | Aug. 16, 1949 |
| 2,502,963 | Klee | Apr. 4, 1950 |

FOREIGN PATENTS

| | | |
|---|---|---|
| 810,793 | France | Mar. 30, 1937 |